United States Patent [19]

Holliday et al.

[11] 4,453,590

[45] Jun. 12, 1984

[54] DUTY CYCLE CONTROLLER

[75] Inventors: Robert A. Holliday, Phoenix; Warren L. Williamson, Mesa, both of Ariz.

[73] Assignee: Sun West Solar Systems, Inc., Phoenix, Ariz.

[21] Appl. No.: 397,459

[22] Filed: Jul. 12, 1982

[51] Int. Cl.$^3$ ............................................. F28F 27/00
[52] U.S. Cl. ........................................ 165/12; 62/157; 62/158; 62/231; 236/46 R; 236/46 C; 236/46 F
[58] Field of Search ..................... 165/12; 62/157, 158, 62/231; 236/46 R, 46 C, 46 F

[56] References Cited

U.S. PATENT DOCUMENTS

| | | | |
|---|---|---|---|
| 3,636,369 | 1/1972 | Harter | 62/158 |
| 4,045,973 | 9/1977 | Anderson et al. | 62/158 |
| 4,094,166 | 6/1978 | Jerles | 62/158 |
| 4,102,389 | 7/1978 | Wills | 62/158 |
| 4,142,375 | 3/1979 | Abe et al. | 62/158 |
| 4,320,316 | 3/1982 | Horii et al. | 62/158 |
| 4,356,962 | 11/1982 | Levine | 165/12 |
| 4,384,461 | 5/1983 | Kurtz | 62/157 |

Primary Examiner—William R. Cline
Assistant Examiner—Peggy A. Neils

[57] ABSTRACT

A duty cycle controller for an air conditioning system. Solid state switches are connected in series with the heating and cooling switches of a thermostat in circuits for energizing the cooling and heating subsystems, respectively, of an air conditioner. A switch control circuit, when enabled, causes the solid state switches to be conductive when set and nonconductive when reset. Timing signals from a counter applied to the switch control circuit determine the state of the switch control circuit and thus the duty cycles for the heating and cooling subsystem. The controller is provided with a safety circuit which disables the switch control circuit to render the solid state switches nonconductive for a predetermined period of time after a power interruption or after a cooling or heating switch of the thermostat opens. The controller assures that each heating and cooling duty cycle begins with a full energization period. The length of the heating and cooling duty cycles can be readily varied.

10 Claims, 3 Drawing Figures

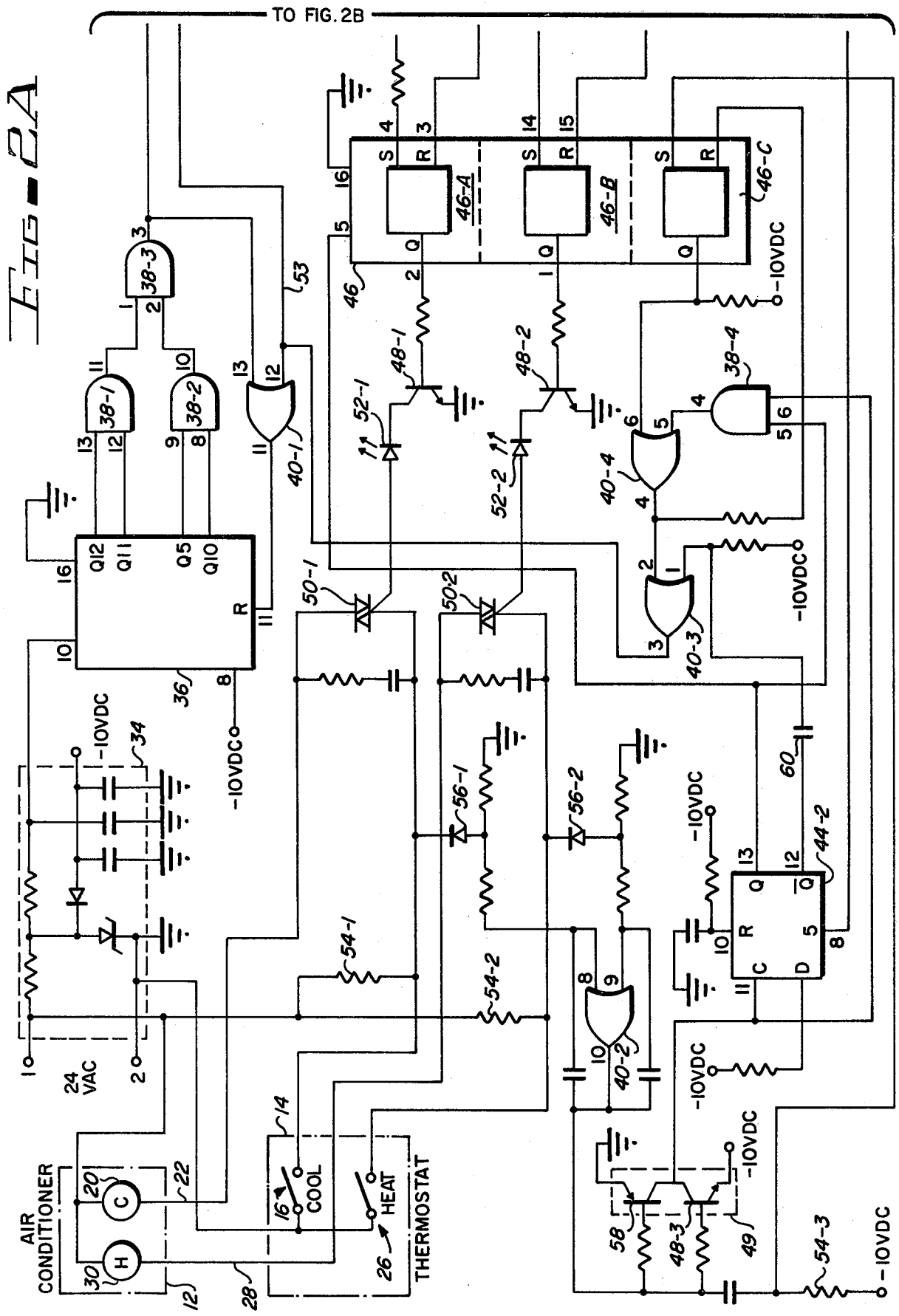

DUTY CYCLE CONTROLLER

BACKGROUND OF THE INVENTION

1. Field of the Invention

This invention is in the field of controls for air conditioning systems, and more particularly relates to an improved duty cycle controller for such systems.

2. Description of the Prior Art

The use of timers to alternately switch the compressor of an air conditioner on and off, or to provide it with a duty cycle while the thermostat of the air conditioning system is calling for cooling, or producing a cooling signal, is known. However, problems with such timers, or duty cycle controllers, are that the duty cycle timer is not synchronized with the energization signals; i.e., a cooling signal, produced by the thermostat so that if the thermostat is producing a cooling signal when the timer is in its off position, or nonenergization phase, several minutes may elapse before the desired heating or cooling function of the air conditioner is energized. During this time interval, the fan of the air conditioner will be energized so that hot air from the air conditioner will be circulated into the space to be cooled until the timer is in its on phase. This, of course, adds to the discomfort rather than providing the desired correction to the temperature of the space whose air is being conditioned.

Another problem with prior art controllers is that they provide no protection against damage to the compressor of the refrigeration unit, or of a heat pump caused by restarting the compressor before all the liquified refrigerant that may have drained into the compressor has vaporized. Starting a compressor with liquified refrigerant in it, will destroy the compressor.

SUMMARY OF THE INVENTION

The present invention provides a duty cycle controller for an air conditioning system. A pair of solid state switches are adapted to be connected in series with the cooling switch and the heating switch of the cooling and heating energization circuits of the system. A switch control circuit is provided which includes two latches, which latches when enabled and set, cause the switches to be conductive and when reset, to be nonconductive. When disabled, the switches are nonconductive. A timing circuit produces timing pulses which control the state of the latches and, by a multi-positioned switch, the heating and cooling duty cycles of an air conditioner can be varied. A safety circuit prevents the switch control circuit from rendering the switches conductive for a predetermined delay after a power interruption or after a cooling or heating thermostat signal goes off. A control circuit initiates a duty cycle at the time a thermostat switch closes to produce a heating or cooling signal, if the switch control circuit is enabled, or when the switch control circuit is enabled after being disabled by the safety circuit, so that a full energization period, either cooling or heating, will occur when the heating or cooling system of the air conditioner is first energized.

It is therefore an object of this invention to provide an improved duty cycle controller in which the energy consumption by the system is minimized, while temperature variations in the space conditioned by the system is also minimized.

It is another object of this invention to provide an improved duty cycle controller for an air conditioning system that prevents the refrigeration unit of an air conditioner from being energized for a predetermined safety delay after a main power supply interruption or after the refrigeration unit has been energized and then deenergized as the result of the cooling signal having been produced by the thermostat of the system which signal then terminates.

It is still another object of this invention to provide an improved duty cycle controller in which the duty cycles are synchronized with the thermostat heating and cooling control signals.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concept of the disclosure, and in which:

FIGS. 2A and 2B are schematic circuit diagrams of the duty cycle controller.

DESCRIPTION OF THE PREFERRED EMBODIMENTS

Figure 1:
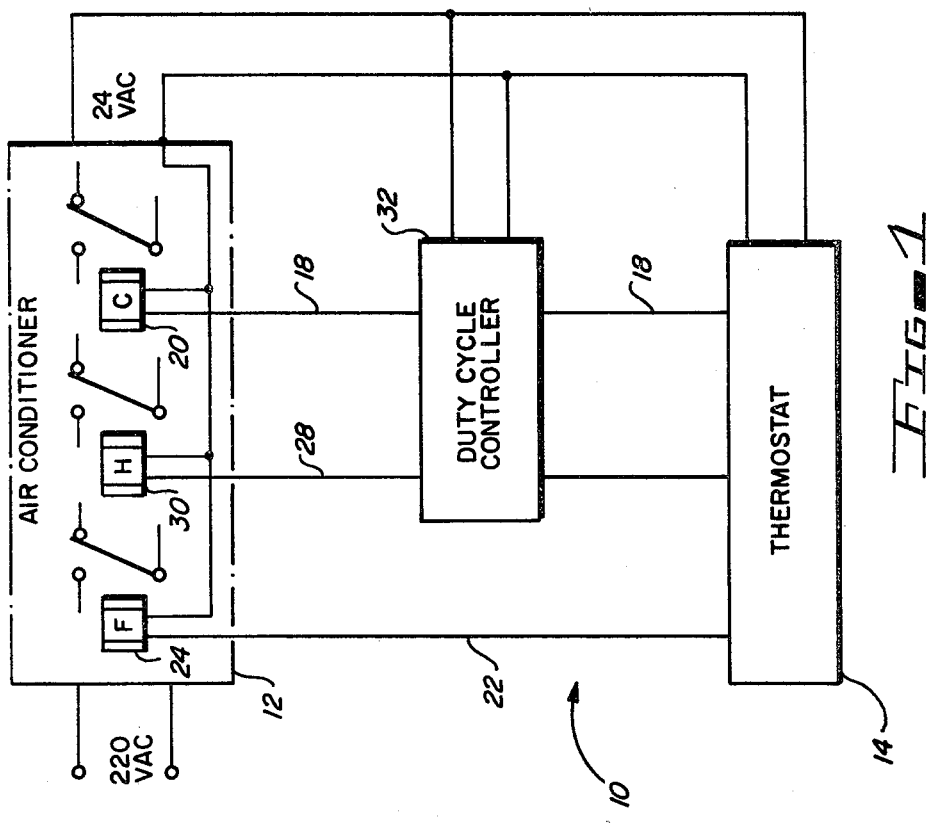
FIG. 1 is a block diagram of an air conditioning system with a duty cycle controller of the present invention.

In FIG. 1, the three major components of air conditioning systems 10 are illustrated. Conventional air conditioner 12 has three subsystems, a refrigeration subsystem, a heating subsystem and a fan subsystem for circulating air typically from a substantially enclosed space through conditioner 12 to either heat or cool the air moving therethrough. Details of the subsystems of the air conditioner are not illustrated as they are conventional and not believed necessary to the understanding of this invention. The refrigeration subsystem and the fan subsystem are typically electrically powered and the heating subsystem may be, or the source of heat may be, gas, oil, or the heat exchanger of a heat pump, for example.

Thermostat 14 is a conventional thermostat which is located in the space, the temperature of the air of which is to be conditioned, heated or cooled by air conditioner 12. Thermostat 14 has two modes of operation, a cooling mode, and heating mode, and it is designed so that it can operate in only one mode at a time. In its cooling mode, it will produce a cooling signal whenever the temperature sensed by the thermostat exceeds a predetermined temperature. Thermostat 14 does this by producing a cooling signal by closing cooling switch 16 or by rendering it conductive if switch 16 is a solid state switch, for example. Closing switch 16 will complete a cooling energization circuit 18, assuming circuit 18 is otherwise complete, to energize cooling relay 20 which will apply 220 V AC electrical power from a conventional electrical utility, for example, to the cooling subsystem of air conditioner 12. Essentially simultaneously, thermostat 14 will produce a fan energization signal by closing a fan switch which is not illustrated, to complete fan energization circuit 22 which energizes fan solenoid 24 which applies AC power to the fan subsystem of conditioner 12 to circulate air through conditioner 12 to cool the air and typically the air in the space in which the thermostat 14 is located.

When thermostat 14 is in its heating mode, it will produce a heating control signal whenever the temperature sensed by thermostat 14 is less than some predetermined minimum temperature by closing heating switch 26 which normally completes heat energization circuit 28. When switch 26 closes, heating solenoid 30 will be energized assuming circuit 28 is otherwise complete to energize the heating subsystem of air conditioner 12. At essentially the same time, the fan subsystem will be energized by thermostat 14 to circulate air through conditioner 12 so that it can be heated by the heating subsystem of conditioner 12 and the air in the space in which thermostat 14 is located can also be heated.

Duty cycle controller 32 is connected between thermostat 14 and conditioner 12 and in series with the cooling and heating energization circuits 18, 28. Power for controller 32 and thermostat 14 is typically 24 V AC which is available in air conditioner 12 by means of a step-down transformer.

Figure 2B:
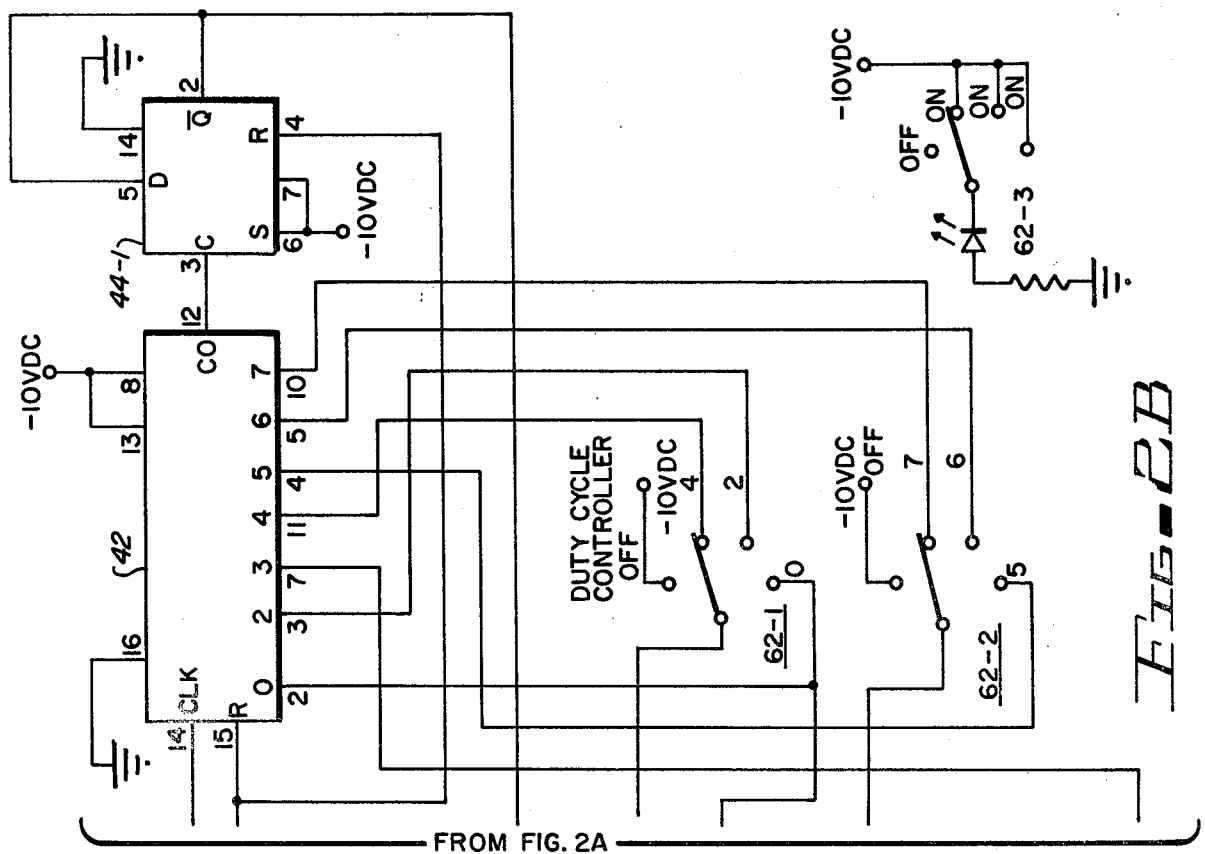

Referring to FIG. 2, 24 V AC from conditioner 12 is applied to the power conditioner circuit 34 which produces −10 V DC and an approximately 60 cycle square wave clock signal which is applied to binary counter 36. Selected outputs of counter 36 are applied to two input and gates 38-1 and 38-2 the outputs of which are connected to the inputs of and gate 38-3, so that gate 38-3 will produce a clock pulse once every 3600 cycles, or one per minute. The clock pulse on the output terminal of and gate 38-3 is applied through two input or gates 40-1 to the reset terminal of counter 36 to reset or initialize counter 36 so that it will produce a clock pulse at the output terminal of gate 38-3 once every minute.

Clock pulses from and gate 38-3 are also applied to the clock terminal of divide by eight counter 42 which has eight decoded outputs. The carry-out signal from counter 42 is applied to the clock input terminal C of D type flip-flop 44-1. Counter 42 and flip-flop 44-1 together form a divide by 16 counter. Outputs of counter 42 and flip-flop 44-1 timing control signals are selectively applied to the set and reset terminals of two stages of three stage R.S. latch 46, the two stages being 46-A and 46-B. The Q output of stage 46-A biases an npn-transistor 48-1 the collector of which is connected to the gate terminal of triac 50-1 a three electrode semiconductor switch through light emitting diode 52-1. Switch 50-1 is connected in series with cooling switch 16 of cooling energization circuit 22. Switch 50-1 will be rendered conductive when the Q output of stage 46-A goes high. Similarly, the Q output of stage 46-B is connected to the base of transistor 48-2, the collector of which is connected to the gate of triac 50-2 through light emitting diode 52-2. Switch 50-2 is rendered conductive when the Q output of stage 46-B is high. It should be noted that triac 50-2 is connected into heating energization circuit 28 in series with heating switch 26.

Or gate 40-2 has an input terminal connected to the high side of the 24 V AC signal through resistor 54-1 and diode 56-1 and the other input terminal is connected through 54-2 and diode 56-2 so that when both heating and cooling switches 26, 16 are open, both inputs to gate 40-2 are low. As a result, a low signal is applied to the base of pnp transistor 58 and npn transistor 48-3 which form inverter 49 which inverts the output of or gate 40-2 and applies it to the clock input terminal C of D flip-flop 44-2.

The Q output of flip-flop 44-2 is applied to one terminal of or gate 40-1 through and gate 38-4, or gate 40-4 and or gate 40-3 as well as the reset terminals of counter 42 and flip-flop 44-1 over reset line 53. The Q output of flip-flop 44-2 is also applied to an input terminal of two input and gates 38-4. The $\overline{Q}$ terminal of flip-flop terminal 44-2 is capacitatively coupled through capacitor 60 to an input terminal of or gate 40-3 the output of which is also connected to the same input terminal of or gate 40-1 as is the Q output of flip-flop 44-2. The other input terminal of and gate 38-4 is connected to the output of inverter circuit 49. The output of and gate 38-4 is connected to one input of or gate 40-4. The other input to or gate 40-4 is the Q output terminal of stage 46-C of latch 46.

If switch 16 and 26 are both open, when power is applied to controller 32, the reset terminal of flip-flop 44-2 will momentarily be high which resets flip-flop 44-2. As $\overline{Q}$ goes high, a positive pulse is applied through capacitor 60, through or gate 40-3 to the reset line 53 and through gate 40-1 to the reset terminal of counter 36. This initializes clock 36, counter 42 and flip-flop 44-1. The Q output of flip-flop 44-2 will be low so that a low signal is applied to the enable terminal of latches 46 which disconnects the latch states from their Q outputs so that neither triac 52-1 nor 52-2 can be rendered conductive. After a predetermined delay, three minutes in the preferred embodiment, a three minute pulse is produced by counter 42 which is applied to the set terminal of flip-flop 44-2. As a result Q terminal will go high which enables latch 46 and since the Q output of flip-flop 44-2 is applied to input 5 of and gate 38-4 and gate 38-4 is enabled. Since the output of inverter 49 is high, a high signal is also applied through and gate 38-4, or gate 40-4, or gate 40-3, to reset line 53 which resets counter 42 and flip-flop 44-1 and initializes the clock 36, and holds them in their reset position or initialized condition, as long as the reset line 53 remains high.

When thermostat 14 is in its cooling mode, for example, and switch 16 closes, to produce a cooling signal, the input on pin 8 of or gate 40-2 goes high. The output of inverter 49 goes low disabling and gate 38-4. A positive pulse developed across resistor 54-3 is applied to the set terminal of stage 46-C which causes Q to go high and a positive pulse is applied to input terminal 6 of or gate 40-4. This pulse would reset the clock 36 and counter 42 and flip-flop 44-1 if they were otherwise not reset. Thereafter clock 36 runs producing one clock pulse per minute, the counter 42 and flip-flop 44-1 produce timing pulses at predetermined time intervals during a 16 minute cycle in the preferred embodiment. Upon the initiation of a cycle of operation, a cooling cycle, the set terminal of stage 46-A will be high because it is connected to the $\overline{Q}$ output of flip-flop 44-1 and will remain high for eight minutes, which will then go low for eight minutes. Depending upon the position of the pole of switch 62, stage 46-A will have applied to its reset terminal a positive pulse at 0, 2 or 4 minutes of each eight minute half cycle. As long as a positive pulse is applied to the set terminal, the output Q will stay high so that for cooling, the duty cycles available in the preferred embodiment are 8, 10 and 12 minutes on and 8, 6 and 4 minutes off, respectively, with a cycle lasting 16 minutes. For heating, the on cycles are in the preferred embodiment, 7, 6 and 5 minutes on, and 1, 2 and 3 minutes off, respectively, with a cycle lasting 8 minutes.

When cooling switch 16 opens, after being closed, the output of or gate 40-2 goes low, and the output of inverter 49 goes high. On the transition of the signal from low to high at the clock terminal of flip-flop 44-2, the signal present at the D terminal, a low signal, is applied to the Q output terminal which causes Q to go low and $\overline{Q}$ to go high. As Q goes low, latches 46 are disabled, and clock 36, counter 42 and flip-flop 44-1 are reset or initialized. After three minutes have elapsed, flip-flop 44-2 is set by the 3 minute pulse and the controller is on standby until a thermostat signal is produced by either cooling switch 16 or heating switch 26 being closed. If at the time the latches 46 are enabled, one of the thermostat switches is closed, the positive pulse produced by stage 46-C will reset the clock 36, counter 42 and flip-flop 44-1, so that the initial energization period of the duty cycle will always be of the desired length.

In a preferred embodiment, the significant components of controller 32 are:

|  |  |
|---|---|
| Binary Counter 36 | CD 4040 A |
| Divider by eight counter 42 | CD 4022 A |
| Latch 46 | CD 4043 A |
| D Flip-flops 44 | CD 4013 A |
| Or Gates 40 | CD 4071 B |
| And Gates 38 | CD 4081 B |
| npn Transistors | 2 N 3904 |
| pnp Transistors | 2 N 3906 |
| Diodes | 1 N 4003 |
| Light emitting Diodes | 2 N 3904 |
| Zener Diodes | 1 N 758 A | which are standard commercial items manufactured by RCA, for example.

From the foregoing, it is obvious that the improved duty cycle controller of this invention provides a plurality of heating and cooling duty cycles for an air conditioner system to minimize the costs of the energy to maintain desirable temperature levels in a given space, which assures that the compressor or compressors of the system will not be started before a safe period of time has elapsed after either a power interruption or after a thermostat heating or cooling signal has been terminated, and synchronizes the duty cycles of the controller with the thermostat, so that whenever the thermostat demands cooling or heating, the length of the energization portion of the first duty cycle will be the maximum.

What is claimed is:

1. A duty cycle controller for an air conditioning system including cooling means, heating means, and a thermostat having a cooling switch and a heating switch comprising:
    a first solid state switch means adapted to be connected in series with the cooling switch of the thermostat in a circuit, said first switch means for energizing the cooling means of the air conditioner when conductive during a cooling cycle of operation;
    a second solid state switch means adapted to be connected in series with the heating switch of the thermostat in a circuit said second switch means for energizing the heating means of an air conditioner when conductive during a heating cycle of operation;
    switch control circuit means for causing said first and second switch means to be conductive when set and nonconductive when reset;
    timing means including means for producing clock pulses at a single frequency and digital counter means to which the clock pulses are applied for producing timing pulses at predetermined time intervals during each cycle of operation for setting the switch control circuit means to render each of the switch means conductive for different periods of time which periods differ by amounts equal to an integer times the period of the clock pulses, and for resetting the switch control means to render each of said switch means nonconductive for different periods of time;
    safety means for preventing the switch control means from rendering said switch means conductive for a predetermined delay period after a power interruption or after a thermostat switch opens after having been closed; and
    control means for initiating the conductive period for the switch means at the time a thermostat switch closes.

2. A duty cycle controller as defined in claim 1 in which the frequency of the clock pulses is substantially one cycle per minute.

3. A duty cycle controller as defined in claim 1, in which the solid state switch means are triacs.

4. A duty cycle controller as defined in claim 3, in which the switch control circuit means includes a three state R-S latch.

5. A duty cycle controller as defined in claim 4, in which the timing means includes switch means for varying the on/off periods of the duty cycles.

6. A duty cycle controller for controlling the energization of heating and cooling means of an air conditioner in response to heating or cooling signals produced by a thermostat, said controller adapted to be connected to a source of electrical power, comprising:
    resetable clock means for producing clock pulses at a constant frequency;
    resetable counter means to which the clock pulses are applied to produce timing pulses;
    cooling switch means adapted to be connected in series in the cooling energization circuit for the cooling means of the air conditioner;
    heating switch means adapted to be connected in series in the heating energization circuit of the heating means of the air conditioner;
    switch control means to which said timing pulses are selectively applied to render the cooling and heating switch means conductive for a conductive period and nonconductive for a nonconductive period;
    safety means for preventing the switch control means from permitting the switch means to become conductive for a predetermined safety period after the occurrence of a power interruption or after the termination of a heating or cooling signal by the thermostat;
    means for resetting the clock means and counter means when the heating or cooling signal is first produced by the thermostat; and
    means for resetting the clock and counter means at the end of the safety period if a heating or cooling signal is produced by the thermostat during such safety period.

7. A duty cycle controller as defined in claim 6, in which the cooling and heating switch means are solid state switches.

8. A duty cycle controller as defined in claim 7, in which the switch control means includes a three state R.S. latch.

9. A duty cycle controller as defined in claim 6, in which rotary switch means apply the timing pulses to the switch control means.

10. A duty cycle controller as defined in claim 6 in which the frequency of the clock pulses is a function of the frequency of its source of electrical power.

* * * * *